United States Patent [19]

Konoki et al.

[11] 4,444,732

[45] Apr. 24, 1984

[54] TUBE FOR THERMAL CRACKING OR REFORMING OF HYDROCARBON

[75] Inventors: Keizo Konoki, Tokyo; Takanobu Shinohara; Ikuyoshi Kochi, both of Chiba; Toshio Anzai, Mobara; Hisakatsu Nishihara, Hirakata; Junichi Sugitani, Hirakata; Koji Tsuchida, Hirakata, all of Japan

[73] Assignees: Kubota Ltd, Osaka; Toyo Engineering Corporation, Tokyo, both of Japan

[21] Appl. No.: 451,393

[22] Filed: Dec. 20, 1982

[30] Foreign Application Priority Data

May 14, 1982 [JP] Japan .................................. 57-82181

[51] Int. Cl.³ ............................................. B01J 19/02
[52] U.S. Cl. ................................. 422/310; 75/126 B; 75/126 F; 75/128 R; 138/141; 208/48 R; 422/241; 422/312; 585/636
[58] Field of Search ............... 422/240, 241, 310, 312; 585/636; 208/48 R; 75/126 R, 126 B, 126 F, 126 Q, 128 R, 128 A, 128 W, 128 G; 138/141, 145, 146

[56] References Cited

U.S. PATENT DOCUMENTS

| | | | |
|---|---|---|---|
| 2,231,446 | 2/1941 | Grosse | 422/241 X |
| 2,448,462 | 8/1948 | Renzoni | 75/128 W |
| 3,262,983 | 7/1966 | Ladd et al. | 585/636 X |
| 3,536,776 | 10/1970 | Lo | 208/48 R X |
| 4,343,658 | 8/1982 | Baker et al. | 422/312 X |

FOREIGN PATENT DOCUMENTS 5725386  2/1982  Japan ................................. 422/241

Primary Examiner—Richard L. Chiesa
Attorney, Agent, or Firm—Armstrong, Nikaido, Marmelstein & Kubovcik

[57] ABSTRACT

A reactor tube for thermally cracking or reforming of hydrocarbons wherein a reacting layer contacting hydrocarbons is made of heat resisting steel comprising, in terms of % by weight, 0.3 to 1.5% C, up to 3% Si, 6 to 15% Mn, 20 to 30% Cr, up to 3% Nb, up to 0.15% N, the balance being substantially Fe and a covering layer which covers the said reacting layer is made of Fe-Cr-Ni heat resisting steel and is fused to the reacting layer at their boundary.

12 Claims, 7 Drawing Figures

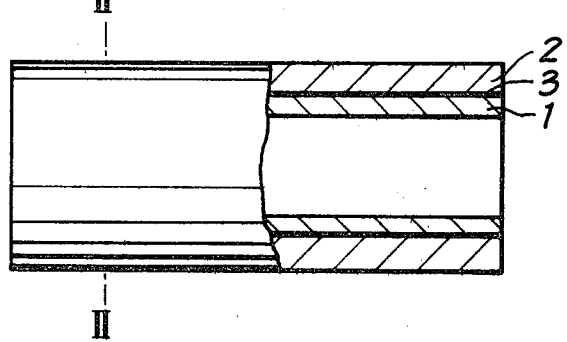
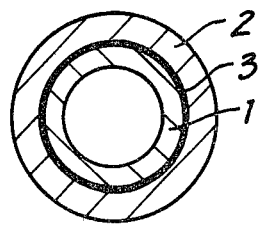
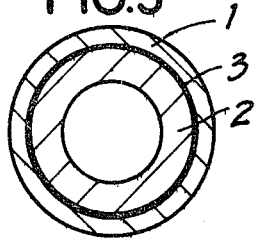
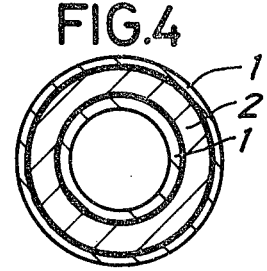
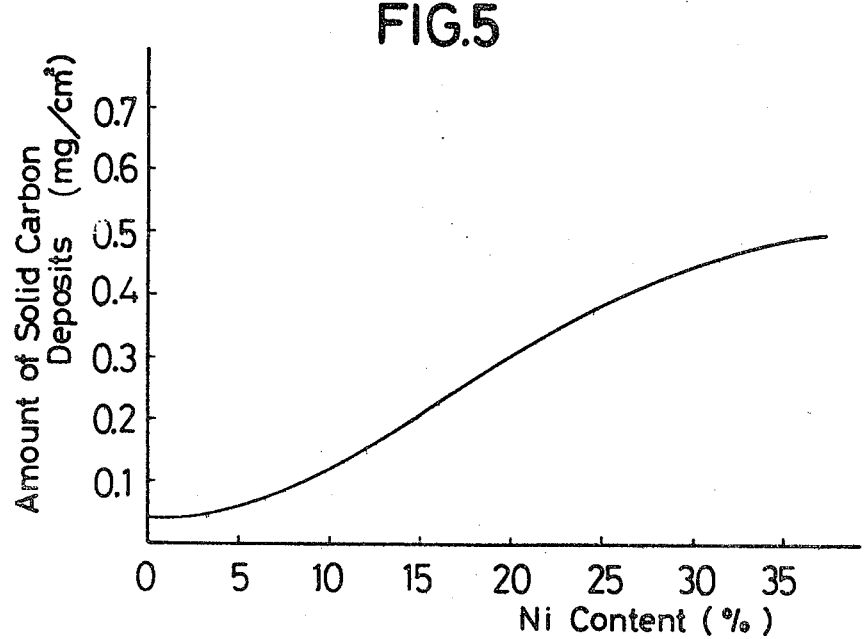

TUBE FOR THERMAL CRACKING OR REFORMING OF HYDROCARBON

BACKGROUND OF THE INVENTION

The present invention relates to a reactor tube for thermal cracking or reforming hydrocarbons, in particular a reactor tube which prevents deposition and building up of solid carbon thereon accompanied by chemical reaction of hydrocarbon and further prevents carburization.

Reactor for thermal cracking and reforming of hydrocarbon used here is in tubular form and passes hydrocarbon therethrough in liquid or gaseous form under high pressures and temperatures for thermal cracking or reforming, in the presence or absence of a catalyst layer. The material heretofore used for such reactors is Fe-CR-Ni austenitic heat resisting steel which contains large amounts of Ni and Cr and has been generally applied for equipments at high-temperature use. It has been the usual practice to increase the Ni content to enhance heat resisting property of tube material to be used at higher temperatures.

Since thermal cracking or reforming of hydrocarbons accompanies deposition of solid carbon, when reaction is continued by using such reactor tube made of Fe-Cr-Ni steel as aforesaid, solid carbon inevitably deposits and builds up on the wall surface (inner wall surface, outer wall surface or both inner and outer wall surfaces depending on the way of use of reactor tube) to be in contact with hydrocarbons. When such deposit of solid carbon is left unattended, it not only obstructs the passage of fluid containing hydrocarbon through the tube but also remarkably reduces overall heat transfer coefficient in the reaction heat supplied or removed from outside the tube and thus operation becomes difficult to be continued. As the result periodical shutdown of operation is required for removal of carbon deposits by various methods, so-called decoking, although the reactor is to be operated continuously as a rule. Besides, the conventional reactor tube as aforesaid presents such problems as deterioration of tube material due to carburizing through reaction wall surface, particularly a remarkable reduction of ductility and danger of generation of cracks due to embrittling of tube material under high pressures.

In order to solve the above problems, we have carried out intensive research and found out that the reason for the remarkable carbon deposits in the reactor tube made of Fe-Cr-Ni heat resisting steel is that Ni contained in the steel material acts catalytically to accelerate deposition of solid carbon on the tube surface through hydrocarbon and that there exists a correlation between the amount of solid carbon deposits and Ni content in the tube material and by restricting such Ni content, it is possible to inhibit and prevent deposition of solid carbon on the tube surface. As for carburization, when steel material of the tube contains appropriate amount of Mn and Nb, carburization from the tube wall surface is effectively restricted and deterioration of tube material can be prevented.

SUMMARY OF THE INVENTION

The present invention was accomplished based on the aforesaid analysis. This invention offers a reactor tube whose reacting layer (inner wall layer) to be in contact with hydrocarbon is made of Fe-Cr heat resisting steel free from Ni or Fe-Cr-Ni heat resisting steel containing up to 10% of Ni so that it does not substantially exhibit the said catalytic action to accelerate deposition of solid carbon and whose reacting layer is covered by an outer layer made of the conventional material for use in equipments at high temperatures such as Fe-Cr-Ni heat resisting steel. By employing such double layer structure for the reactor tube, we have succeeded in inhibiting the deposition of solid carbon resulted by reaction as much as possible and ensuring stable operation without carrying out decoking for long time while maintaining the required characteristics of the reactor tube used under high temperatures and high pressures.

More specifically the present invention provides reactor tube for thermally cracking or reforming hydrocarbons with which deposition of solid carbon accompanied by reaction can be prevented by forming the reacting layer in the reaction zone to be in contact with hydrocarbons, with heat resisting steel comprising in terms of % by weight, 0.01–1.5% C, up to 3% Si, up to 15% Mn, 13 to 30% Cr, up to 0.15% N and the balance substantially Fe and by forming covering layer which covers the said reacting layer and is fused thereto at the boundary surface with heat resisting steel comprising, in terms of % by weight, 0.1 to 0.6% C, up to 2.5% Si, up to 2% Mn, 20 to 30% Cr, 18 to 40% Ni, up to 0.15% N and the balance substantially Fe.

Another object of the present invention is to provide the reactor tube for thermally cracking or reforming hydrocarbons wherein deposition of solid carbon on the tube surface is prevented and carburization through the tube surface is inhibited by forming the reacting layer of the reactor tube in the reaction zone to be contact with hydrocarbons, with Fe-Cr-Mn-Nb heat resisting steel comprising in terms of % by weight 0.3 to 1.5% C, up to 3% Si, 6 to 15% Mn, 20 to 30% Cr, up to 3% Nb, up to 0.15% N and the balance substantially Fe or Fe-Cr-Mn-Nb-Ni heat resisting steel obtained by replacing some amount of Fe by Ni in the amount up to 10% and by forming the covering layer which covers the said reacting layer and fused thereto at the boundary surface with Fe-Cr-Ni heat resisting steel comprising in terms of % by weight 0.1 to 0.6% C, up to 2.5% Si, up to 2% Mn, 20 to 30%Cr, 18 to 40% Ni, up to 0.15% N and the balance substantially Fe or Fe-Cr-Ni heat resisting steel obtained by replacing some amount of Fe by one or more elements selected from Mo, W and Nb, in a combined amount of up to 5% by weight.

BRIEF DESCRIPTION OF THE DRAWINGS

FIG. 1 is a front elevation view partly broken away and showing a reactor tube according to the invention;

FIG. 2 is a view in section taken along the line II—II in FIG. 1;

FIGS. 3 and 4 are sectional views of reactor tube according to other examples of the invention;

FIG. 5 is a graph showing the correlation between Ni content of reactor tube material and the amount of deposit of solid carbon on the reacting layer surface;

DETAILED DESCRIPTION OF THE INVENTION

Figure 6:
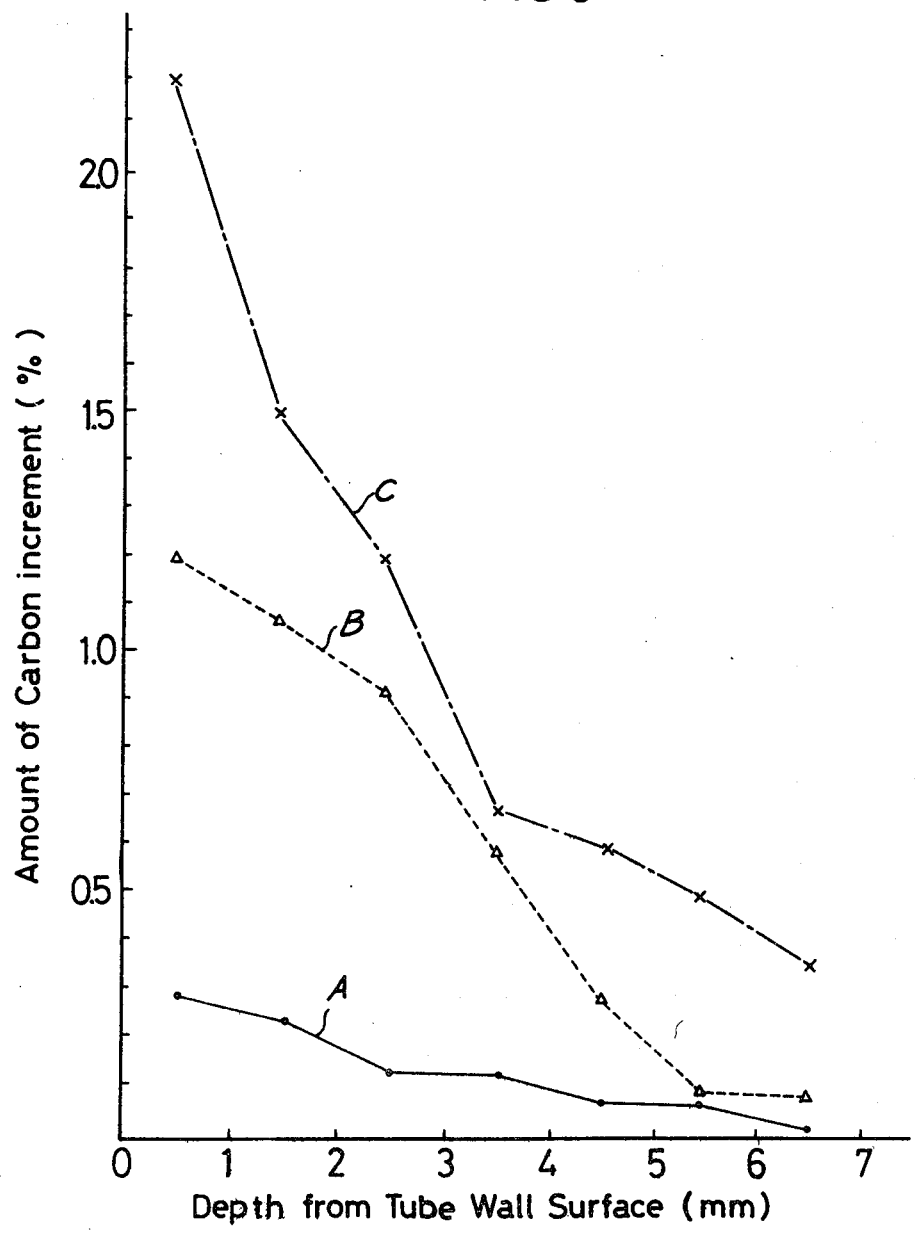
FIG. 6 is a graph showing the amount of carbon increment by carburizing into the reacting layer.

When the reaction zone of the tube which is brought in contact with hydrocarbons is in the inner surface of the tube, the reacting layer 1 at the inside as illustrated in FIGS. 1 and 2, is made of a heat resisting steel of Fe-Cr ferritic type or martensitic type free from Ni, or of Fe-Cr-Ni heat resisting steel of ferritic, ferritic-austenitic or martensitic type containing up to about 10% of Ni.

The said Fe-Cr heat resisting steel may be for example, the one made of 13 to 30% Cr (% by weight, the same as hereinafter), 0.01 to 1.5% C, up to 2.5% Si, up to 2.0% Mn, up to 0.15% N and the balance substantially Fe or the one wherein some amount of Fe is replaced by one or more of Mo, W and Nb in a combined amount of up to 5.0% to obtain further improved characteristics of the material.

The covering layer 2 which covers the outside of the said reacting layer 1 and is made of Fe-Cr-Ni austenitic heat resisting steel usually used for tubes of this type is fused to the aforesaid reacting layer 1 at the boundary surface 3 to obtain a double layer structure. Contrary to the above, when the reaction zone of the tube which comes contact with hydrocarbons is in the outer surface of the tube, the reacting layer 1 of the aforementioned chemical compositions is provided on the outside and the covering layer 2 of the aforesaid chemical compositions is provided on the inside as shown in FIG. 3.

When both inner surface and outer surface of reactor tube become the reaction zone, reacting layers 1, 1 may be provided at both surfaces and covering layer 2 may be interposed between the both reacting layers 1,1, as illustrated in FIG. 4.

FIG. 5 indicates the correlation between the amount of solid carbon deposits (in $mg/cm^2$) and Ni content (%), in the reactor tube made of Fe-Cr-Ni heat resisting steel (18% Cr, 0.8% C, 1.5% Si, 1.1% Mn, 0.05% N, up to 35% Ni, 43.5 to 78.55% Fe) (Experimental conditions: Amount of ethane supplied is 400 cc/min, S/C=1.5, duration of passage of ethane gas is one hour, inner diameter of tube is 110 mm, temperature is 900° C.; wherein, S/C is Mol $H_2O$/atomic C).

As shown in the drawing, the amount of deposits of solid carbon increases with the increment of Ni content in the tube material. For example, the Ni content of Fe-Cr-Ni heat resisting steel which has been used for the material of reactor tube of this type is about 35% and it coincides with the fact that remarkable deposition of solid carbon was unavoidable with the conventional reactor tube. It is because, as mentioned above, Ni on the surface of tube wall acts catalytically to accelerate deposition of solid carbon. Based upon this fact supported by experiments, maximum content of Ni in the present invention is limited to about 10.0% or preferrably up to about 5.0% in order to inhibit and prevent deposition of solid carbon as much as possible.

Covering layer 2 which covers the reacting layer 1 may be made of Fe-Cr-Ni austenitic heat resisting steel having been usually used for the tube of this type. The examples of such chemical compositions of steel may be in terms of % by weight 20 to 30% Cr, 18 to 40% Ni, 0.01 to 0.6% C, up to 2.5% Si, up to 2.0% Mn, up to 0.15% N and the balance substantially Fe or the chemical compositions of steel wherein some amount of Fe is replaced by one or more elements selected from Mo, W and Nb in a combined contents of up to 5.0%.

According to the present invention, the reacting layer 1 is made of heat resisting steel free from Ni or containing Ni within the range where it does not substantially act catalytically to deposit solid carbon and the covering layer 2 covers the reacting layer 1, both the reacting layer and the covering layer being joined together by fusing at the boundary surface.

The reactor tube is thus given a double layer construction wherein covering layer 2 which covers the said reacting layer 1 is fused to the reacting layer 1 at the boundary surface and through these means, deposition of solid carbon on the reacting layer wall surface of the tube is effectively inhibited and the tube is simultaneously provided with such mechanical properties as high strength and high creep rupture strength at high temperatures, the properties possessed by Fe-Cr-Ni austenitic heat resisting steel and thus the reactor tube becomes a more preferred reactor tube to be used under high pressures and high temperatures.

Another embodiment of the present invention is the reactor tube having reacting layer 1 made of substantially Ni-free Fe-Cr-Mn-Nb heat resisting steel or low nickel Fe-Cr-Mn-Nb-Ni heat resisting steel containing up to 10% of Ni.

A preferred embodiment of the said Fe-Cr-Mn-Nb heat resisting steel may be the one made of in terms of % by weight 20 to 30% Cr, 0.3 to 1.5% C, up to 3% Si, 6 to 15% Mn, up to 3% Nb, up to 0.15% N and the balance being substantially Fe.

A preferred example of low nickel Fe-Cr-Mn-Nb-Ni heat resisting steel may be the one wherein Fe of the said Fe-Cr-Mn-Nb heat resisting steel is replaced in part by up to 10% of Ni, i.e., the heat resisting steel made of in terms of % by weight 20 to 30% Cr, up to 10% Ni, 0.3 to 1.5% C, up to 3% Si, 6 to 15% Mn, up to 3% Nb, up to 0.15% N and the balance being substantially Fe.

The heat resisting steel forming the covering layer may be comprising Fe-Cr-Ni austenitic heat resisting steel generally used for the material of the tube of the type described. For example, the steel comprising in terms of % by weight 20 to 30% Cr, 18 to 40% Ni, 0.1 to 0.6% C, up to 2.5% Si, up to 2% Mn, up to 0.15% N and the balance being substantially Fe or the one with the above steel composition wherein Fe in the above steel is replaced in part by one or more elements selected from Mo, W and Nb in a combined amount of up to 5%.

In the above examples of the present invention, the chemical compositions of Fe-Cr or low-Ni Fe-Cr-Ni heat resisting steel and Fe-Cr-Mn-Nb or low-Ni Fe-Cr-Mn-Nb-Ni heat resisting steel constituting reacting layer 1 and Fe-Cr-Ni austenitic heat resisting steel constituting covering layer 2 are only explanatory and appropriate modifications and changes such as some increase or decrease of the proportions of the components beyond the above ranges or small addition or removal of components to or from those described above are also useful.

FIG. 6 shows the results of the carburizing test conducted to find the influence of Mn and Nb contained in the tube material upon carburization into the reactor tube. Carburizing conditions: Carburizing treatment through the inner wall surface of the tube by using solid carburizing agent.

Treating temperature: 1100° C.
Duration of treatment: 500 hrs.
The following three sample reactor tubes A, B and C were used for test.
Reactor tube A (double layer tube structure)
Inner reacting layer:
Layer thickness 2 mm Low nickel Fe-Cr-Mn-Nb-Ni heat resisting steel (25% Cr, 5% Ni, 0.6% C, 2.0% Si, 8.1% Mn, 0.45% Nb and 0.05% N)

Outer covering layer:
Layer thickness 10 mm Fe-Cr-Ni heat resisting steel (25% Cr, 35% Ni, 0.48% C, 1.5% Si, 1.0% Mn and 0.05% N)

Reactor tube B (double layer tube structure)
Inner reacting layer:
Layer thickness 2 mm
Low nickel Fe-Cr-Ni Heat resisting steel (25% Cr, 5%
Ni, 1.0% C, 2.0% Si, 1.1% Mn and 0.05% N)
Outer covering layer:
Layer thickness 10 mm
Same Fe-Cr-Ni heat resisting steel as used for the reactor tube A described above.

Reactor tube C (single layer tube—equivalent to the conventional reactor tube having been generally used)
Layer thickness 12 mm
Same Fe-Cr-Ni heat resisting steel as used for the outer covering layer of the reactor tube A described above.

In FIG. 6, curves A, B and C respectively show the results obtained with reactor tubes A, B and C. As shown by this figure, in the case of the reactor tube C having single layer construction made of the material equivalent to those used for the conventional reactor tubes (0.4 C - 25 Cr - 1 Mn - 35 Ni), carbon increases over 2.0% due to carburizing at the tube wall surface indicating remarkable carburization towards the inside of the tube wall.

Whereas in the case of reactor tube B having the inner layer made of low nickel tube material (1 C - 25 Cr -1 Mn - 5 Ni), carbon increment is substantially smaller than that of the reactor tube described above. In the case of the reactor tube A wherein the inner layer is made of low nickel material containing Nb and a large amount of Mn (0.6 C - 25 Cr - 8 Mn - 0.5 Nb - 5 Ni), carbon increment due to carburization is extremely small, being less than about 0.3%. Such effect to inhibit carburization is improved when Mn is increasingly contained and Nb is added. Therefore, in order to obtain anti-carburizing effect by Mn and Nb, the reacting layer 1 facing the reaction zone is made of the material containing Nb and large amounts of Mn. The content of Mn is defined to be at least 6%. However, if Mn is excessively contained, ductility decreases remarkably and cast products are susceptible to cracks upon solidifying in the casting process and therefore the maximum limit of Mn content is defined to be 15%. When Nb is contained in a large amount, SIGMA phase precipitates during use at high temperatures and ductility remarkably decreases and consequently the maximum limit of Nb is defined to be 3%.

Figure 7:
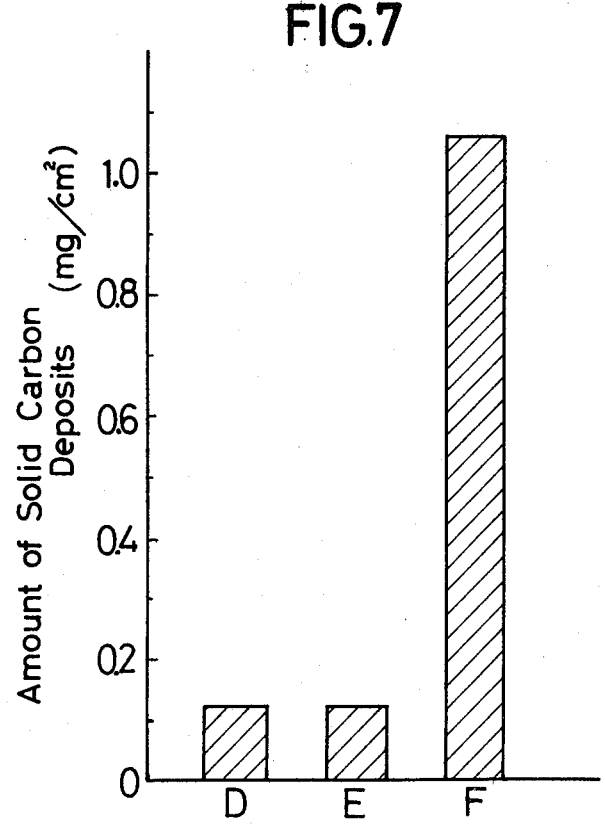
FIG. 7 is a graph to indicate the amount of solid carbon deposits on the reacting layer surface.

FIG. 7 is a graph giving comparison of the amounts of solid carbon deposits on the tube wall surface in thermal cracking and reforming reaction test of hydrocarbon wherein the inside of the tube is used for reaction zone, and the three kinds of reactor tubes D, E and F are made of the material containing a large amount of Mn and Nb or the material of low Mn content.

Test conditions: Ethane supply 400 cc/min, S/C=1.5, temperature 900° C., duration one hour and inner dia. of reactor tube 110 mm.

Reactor tube D and E have double layer construction made up of reacting layer (thickness 2 mm) at the inside and covering layer (thickness 10 mm) at the outside. Inner layer in reactor tube D is made of low nickel Fe-Cr-Mn-Nb-Ni heat resisting steel containing Nb and a large amount of Mn, whereas reacting layer of reactor tube E is formed by low nickel Fe-Cr-Ni heat resisting steel containing only a very small amount of Mn. Covering layers are in both cases made of Fe-Cr-Ni heat resisting steel usually used for the material of reactor tube of the type described.

Reactor tube F is the conventional reactor tube of single layer construction which is made of the same tube material being used for the covering layer of reactor tubes A and B described above. Chemical compositions of material of the respective reactor tube is as follows:

Reacting layer of reactor tube D: 24.2% Cr, 4.8% Ni, 0.56% C, 1.9% Si, 8.81% Mn, 0.51% Nb and 0.05% N.

Reacting layer of reactor tube E: 25.2% Cr, 4.3% Ni, 0.96% C, 1.76% Si, 1.34% Mn and 0.05% N.

Reactor tube F: 25.1% Cr, 35.5% Ni, 0.43% C, 1.3% Si, 1.2% Mn and 0.05% N.

D, E, and F in FIG. 7 show the results obtained with the aforesaid reactor tubes D, E and F. As it is evident in the figure, amount of solid carbon deposits on the tube wall surface of reactor tube D whose reacting layer is made of Low-Ni Fe-Cr-Mn-Nb-Ni heat resisting steel containing Nb and large amount of Mn is outstandingly smaller than that of the reactor tube F made of conventional Fe-Cr-Ni heat resisting steel, just like the case of reactor tube E having reacting layer made of low nickel Fe-Cr-Ni heat resisting steel containing lesser Mn and free from Nb, indicating an outstanding anti-coking property. It is known from the above that even when such large amount of Mn as described above is contained together with Nb in low nickel Fe-Cr-Ni heat resisting steel wherein Ni content is restricted to up to 10%, solid carbon deposits inhibiting effect is not impeded. From these experiments it is understood that the reactor tube whose reacting layer facing reaction zone is made of Fe-Cr-Mn-Nb or Fe-Cr-Mn-Nb-Ni heat resisting steel with defined Ni, Mn and Nb contents as aforesaid suffers only very small amount of solid carbon deposits on tube wall surface and has an excellent characteristic in reistance to carburization. The reasons for specifying the C content in heat resisting steel as aforesiad are as follows:

In Fe-Cr-Mn-Nb or Fe-Cr-Mn-Nb-Ni heat resisting steel, if the C content is too low, SIGMA phase precipitates during use at high temperatures and ductility remarkably decreases. Besides, the lower the C content, the higher the solidification temperature of molten alloy and as the result in the centrifugal casting of the reactor tube of double layer construction in the manner described later, which is the purpose of this invention, molten alloy of the reacting layer solidifies promptly after casting and thus inferior fusing is made at the boundary of the reacting layer and the covering layer and casting of reactor tube with sound double layer construction becomes difficult. Such difficulties may be overcome by increasing C content. However, when C content is high, materials constituting the covering layer deteriorates due to diffusion transfer of carbon content from reacting layer to covering layer during the use of the reactor at high temperatures. Therefore C content is defined to be 0.3 to 1.5%. Among the metal elements contained in the reacting layer, the contents of Cr, Si, and N are determined by the following:

Cr, with the co-existence of Ni, has the effect to austenitize cast steel structure and thus increase strength at high temperatures and increase oxidation resistance. Cr content must be at least 20% in order to obtain the required strength and oxidation resistance at the temperatures especially above 1000° C. The aforesaid effect is reinforced as the content of Cr increases but when it becomes too high, decrease of ductility after use becomes excessive and therefore upper limit is 30%.

Si serves as a deoxidant during melting of cast steel and also improves anti-carburizing property. However, the Si content must be up to 3.0% since an excess of Si will lead to impaired weldability.

N serves in the form of a solid solution to stabilize and reinforce the austenitic phase, forms a nitride and carbonitride with Nb and Cr, produces refined grains by finely dispersed and precipitated nitride and carbonitride and prevents grain growth, thus contributing to the improvement of creep rupture strength. Preferably the upper limit of the N content is 0.15% since the presence of an excess of N permits excessive precipitation of nitride and carbonitride, formation of coarse particles of nitride and carbonitride and impairment of resistance to weldability.

Among Nb, Mo and W that are selectively contained in covering layer, Nb contributes to the improvement of castability and also forms Nb carbo-nitrides to disperse finely in austenitic phase, thus reinforcing austenitic matrix and greatly increasing creep rupture strength and at the same time it makes the casting structure finer and improves weldability. However, when its content becomes too high, creep rupture strength decreases to the contrary and also ductility is reduced. Therefore the Nb content is preferred to be up to 5%.

Nb usually contains Ta which is the element having the same effect as Nb and therefore a combined amount of Nb and Ta should be up to 5% when Nb contains Ta.

Mo and W also form carbo-nitrides and strengthen austenitic structure in the same manner as Nb while its effect is magnified in the co-presence of Nb. However, when a combined content of Nb+Mo+W exceeds 5%, it reduces ductility as in the case of Nb alone, and it also becomes economically unpreferrable. Whether they are used independently or conjointly, combined content Mo and/or W is preferred to be up to 5%. The reactor tube having double layer structure according to the present invention is preferably made by centrifugal casting. At the casting, molten metal made of Fe-Cr-Ni heat resisting steel containing larger amount of Ni for forming of outer covering layer is poured into the mold for centrifugal casting to obtain the covering layer of desired thickness. Immediately after it solidifies up to the inner wall surface, molten metal of Fe-Cr or low nickel Fe-Cr-Ni or Fe-Cr-Mn-Nb or low nickel Fe-Cr-Mn-Nb-Ni heat resisting steel for forming inner reacting layer is poured to cast the reacting layer of desired thickness. Then rotation of mold is continued to complete casting. By this process, the inner reacting layer and the outer covering layer jointly form a thin fused layer at their adjacent boundary, thus providing a tube of double layers metallurgically joined together. In the above casting, in order to securely fuse the two layers at their boundary, it is preferred that the heat resisting steel of reacting layer has lower melting temperature than that of the heat resisting steel of covering layer. The desirable mutual relation of these melting temperatures is easily obtained by relatively adjusting the chemical compositions of each heat resisting steel, mainly their carbon content, within the range as defined above. There are no specific restrictions as to other casting conditions. Casting temperature of molten metal may be adjusted to the temperature for example 150° C. higher than the melting temperature as conventionally practised and upon necessity to protect the inner surface of reacting layer from air oxidation, an appropriate flux may be applied according to the usual method.

In the conventional centrifugal casting of double layer tube, it has been the usual practise to cast the reacting layer before the inner surface of covering layer solidifies, because if the molten alloy for reacting layer is poured after the covering layer had solidified up to its inner surface, fusing of the two layers at the boundary becomes incomplete and strong bondage of the layers can not be obtained. However, in such method, although a firm bondage of the two layers may be obtained, the molten alloys constituting the two layers excessively mix so that not only it becomes impossible to form each layer for the desired thickness but also the composition of alloy constituting respective layer deviates from what has been intended for and consequently the objective double layer tube can not be obtained. Whereas in the case of the double layer tube of the present invention, reacting layer is cast after the covering layer solidifies up to its inner surface so that the excessive mixing of two layers does not occur and the aforesaid troubles accompanied by it can be avoided and yet in spite of such casting method (casting of reacting layer after solidification of inner surface of covering layer) the two layers are firmly joined together. The reason for it is that the heat resisting steel used for the reacting layer of this invention which has the composition as defined above has a wide temperature range between the start and the end of solidification and consequently even when the molten metal of reacting layer comes in contact with the solidified inner surface of the covering layer, it does not solidify immediately so that an appropriate thickness of fused layer is formed at their boundary surface. Besides, at such moment, covering layer does not remelt in any large amount and the said fused layer gains the minimum thickness required for firmly bonding the two layers and thus an ideal double layer structure is obtained.

To make double layer tube, it is also possible to employ the method for example to combine centrifugal casting with spraying and first a cast tube of single layer is formed by centrifugal casting and then desired alloy is covered by spraying in the said tube surface. However, when the centrifugal casting as aforesaid is employed, it is not only possible to obtain a firm bonding of the two layers but also to give desired thickness to each layer and further to select the appropriate chemical composition for the alloy of each layer so that it satisfies the desired characteristics of the material.

An example of manufacture of the reactor tube of this invention by centrifugal casting may be that molten metal of Fe-Cr-Ni heat resisting steel with high Ni content (25.5% Cr, 35.0% Ni, 0.45% C, 1.0% Si, 0.8% Mn, 0.06% N and the balance substantially Fe) used for covering layer and molten metal of Fe-Cr-Mn-Nb heat resisting steel (25.5% Cr, 0.6% C, 2.0% Si, 9.1% Mn, 0.45% Nb, 0.05% N and the balance substantially Fe) used for reacting layer are prepared in a high frequency induction melting furnace, 20 kg of the said alloy for molten covering layer is poured into the mold for centrifugal casting to form a covering layer of 134 mm in outer diameter, 15 mm in thickness and 500 mm in length and immediately after solidification of its inner surface, 10 kg of molten alloy used for reacting layer is poured to form the reacting layer of 10 mm in thickness, thus obtaining the reactor tube G having concentric double layer construction without mixing inner and outer layer alloys to each other and the two layers fused metallurgically at their boundary.

Another embodiment of the manufacture according to this invention is that in the same method of preparation of molten metal as aforesaid, high Ni content of Fe-Cr-Ni heat resisting molten steel alloy (26.0% Cr, 35.9% Ni, 0.44% C, 1.2% Si, 1.0% Mn, 0.04% N and the balance substantially Fe) is prepared for the covering layer alloy and low nickel content of Fe-Cr-Mn-Nb-Ni heat resisting molten steel alloy (25.3% Cr, 6.5% Ni, 0.55% C, 1.3% Si, 12.2% Mn, 0.65% Nb, 0.06% N and the balance substantially Fe) is prepared for the reacting layer alloy and under the same centrifugal casting conditions as in the foregoing examples, 20 kg of molten alloy of covering layer and 10 kg of molten alloy of reacting layer are casting to obtain the reactor tube H with concentric double layer construction without mixing alloys of the inner and outer layers to each other and the two layers are metallurgically joined together. With the aforesaid reactor tubes G and H, the inner reacting layers were processed to obtain wall thickness of 2 mm respectively and inner diameter was made to be 101 mm and solid carbon deposition test (anti-coking test) and carburizing test were conducted on each of them. In all these tests, the test conditions were same as those used for the tests described before. With the reactor tube G, amount of solid carbon deposit was 0.08 mg/cm$^2$, carburized amount (the amount of C increment) measured at the depths of 0.5 mm, 1.5 mm, 2.5 mm and 5.5 mm from tube wall surface were respectively 0.30%, 0.25%, 0.14% and 0.017%.

In the case of reactor tube H, the amount of solid carbon deposit was 0.12 mg/cm$^2$ and carburized amount (the amount of C increment) measured at the depths of 0.5 mm, 1.5 mm, 2.5 mm and 5.5 mm were respectively 0.25%, 0.21%, 0.11% and 0.05%.

Both of the said two reactor tubes G and H had superior anti-coking property and anti-carburizing characteristics when compared to those of the single layer reactor tube only made of the conventional heat resisting steel used for outer layer (see the graph C of FIG. 6 and graph F of FIG. 7).

As aforesaid, the reactor tube of this invention has the reacting layer made of Fe-Cr, low nickel Fe-Cr-Ni, Fe-Cr-Mn-Nb or low nickel Fe-Cr-Mn-Nb-Ni heat resisting steel and therefore deposition of solid carbon on the surface of tube wall resulted by chemical reaction of hydrocarbons is effectively inhibited. Particularly when the reacting layer is made of Fe-Cr-Mn-Nb or low nickel Fe-Cr-Mn-Nb-Ni heat resisting steel, solid carbon deposits and carburization are effectively inhibited. And besides, since the reacting layer is covered by the high Ni content Fe-Cr-Ni austenitic heat resisting steel layer which is joined together with the reacting layer, the reactor tube gains the high temperature characteristics to sufficiently withstand the use at temperatures exceeding 500° C. and at pressures exceeding atmospheric pressure. Therefore when used for high temperature and high pressure thermal cracking of hydrocarbons alone or its mixture with steam, oxygen containing gas etc. to obtain low molecular hydrocarbons, or for the manufacture of gaseous mixture containing hydrogen or carbon oxide, it enables to maintain stable operation for a long time without various troubles caused by solid carbon deposits or deterioration or damage of tube material due to carburization.

The present invention is not limited to the foregoing embodiments but can be embodied into various modifications without deviating from the spirit of this invention by the ordinary skilled persons in the field of technology to which the present invention belongs and is a matter of course that those modifications belong to the scope of claims.

What is claimed is:

1. A reactor tube for thermally cracking or reforming hydrocarbons characterized by:

a reacting layer to be in contact with hydrocarbons and made of Fe-Cr-Mn-Nb heat resisting steel comprising the following components in the following proportions in terms of % by weight,
   C 0.3 to 1.5
   Si up to 3
   Mn 6 to 15
   Cr 20 to 30
   Nb up to 3
   N up to 0.15,
   the balance being substantially Fe; and a covering layer which covers the said reacting layer and is fused therewith at a boundary therebetween and made of Fe-Cr-Ni heat resisting steel comprising the following components in the following proportion in terms of % by weight,
   C 0.1 to 0.6
   Si up to 2.5
   Mn up to 2
   Cr 20 to 30
   Ni 18 to 40
   N up to 0.15,
   the balance being substantially Fe.

2. The reactor tube as defined in claim 1 wherein the reacting layer is made of low nickel Fe-Cr-Mn-Nb-Ni heat resisting steel wherein a portion of Fe in the reacting layer of the reactor tube is replaced by Ni within the range not exceeding 10% by weight.

3. The reactor tube as defined in claim 1 or 2 wherein a portion of Fe in the covering layer of the reactor tube is replaced by one or more elements selected from Mo, W and Nb in a combined amount of up to 5% by weight.

4. The reactor tube as defined in claim 1 wherein the reacting layer constitutes the inner layer and the covering layer constitutes the outer layer of the reactor tube.

5. The reactor tube as defined in claim 1 wherein the reacting layer constitutes the outer layer and the covering layer constitutes the inner layer of the reactor tube.

6. The reactor tube as defined in claim 1 wherein the reacting layers are formed at both inside and outside of the reactor tube and the covering layer is interposed between the reacting layers.

7. The reactor tube as defined in claim 2 wherein the reacting layer constitutes the inner layer and the covering layer constitutes the outer layer of the reactor tube.

8. The reactor tube as defined in claim 3 wherein the reacting layer constitutes the inner layer and the covering layer constitutes the outer layer of the reactor tube.

9. The reactor tube as defined in claim 2 wherein the reacting layer constitutes the outer layer and the covering layer constitutes the inner layer of the reactor tube.

10. The reactor tube as defined in claim 3 wherein the reacting layer constitutes the outer layer and the covering layer constitutes the inner layer of the reactor tube.

11. The reactor tube as defined in claim 2 wherein the reacting layers are formed at both inside and outside of the reactor tube and the covering layer is interposed between the reacting layers.

12. The reactor tube as defined in claim 3 wherein the reacting layers are formed at both inside and outside of the reactor tube and the covering layer is interposed between the reacting layers.

* * * * *